(12) United States Patent
Rey

(10) Patent No.: US 6,981,042 B1
(45) Date of Patent: Dec. 27, 2005

(54) MULTIMEDIA TERMINAL ADAPTED FOR MULTIPLE USERS

(75) Inventor: Francois Rey, Issy-les-Moulineaux (FR)

(73) Assignee: Thomson Licensing S.A., Boulogne-Billancourt (FR)

( * ) Notice: Subject to any disclaimer, the term of this patent is extended or adjusted under 35 U.S.C. 154(b) by 0 days.

(21) Appl. No.: 09/623,641

(22) PCT Filed: Mar. 8, 1999

(86) PCT No.: PCT/IB99/00461

§ 371 (c)(1),
(2), (4) Date: Sep. 6, 2000

(87) PCT Pub. No.: WO99/45709

PCT Pub. Date: Sep. 10, 1999

(30) Foreign Application Priority Data

Mar. 6, 1998 (EP) .................................. 98400541

(51) Int. Cl.[7] .......................................... G06F 15/173
(52) U.S. Cl. ...................... 709/225; 715/721
(58) Field of Search ................ 348/734, 552; 709/225; 725/11, 25, 30, 97, 141, 153

(56) References Cited

U.S. PATENT DOCUMENTS

| 4,858,117 A | * | 8/1989 | DiChiara et al. ........... 711/208 |
| 5,005,084 A | * | 4/1991 | Skinner ..................... 348/734 |
| 5,862,325 A | * | 1/1999 | Reed et al. ................. 709/201 |
| 5,878,222 A | * | 3/1999 | Harrison .................... 725/139 |
| 5,977,964 A | * | 11/1999 | Williams et al. ............. 725/46 |
| 6,163,316 A | * | 12/2000 | Killian ....................... 345/721 |
| 6,359,661 B1 | * | 3/2002 | Nickum ..................... 348/734 |

FOREIGN PATENT DOCUMENTS

| EP | 0 059 293 A1 | 9/1982 |
| EP | 0 306 702 A2 | 3/1989 |
| EP | 0 435 370 A2 | 7/1991 |
| WO | 97/41541 | 11/1997 |
| WO | 97/44943 | 11/1997 |

OTHER PUBLICATIONS

Imtiaz Mohammed et al.; "Design for dynamic user-role-based security"; Computers & Security, vol. 13, No. 8; Jan. 1994; pp. 661-671.

\* cited by examiner

*Primary Examiner*—Jeffrey Pwu
(74) *Attorney, Agent, or Firm*—Osha Liang LLP

(57) ABSTRACT

A terminal for processing digital audio-visual or multimedia data including a data processing system and a memory, the data processing system storing user profile data (81, 82, 83) relating to the characteristics or preferences of multiple users (80) of the terminal. In a particularly preferred embodiment, the user profiles correspond to modes of operation of the terminal, the user profile data including priority data indicating the priority rights of each user to terminal resources.

12 Claims, 6 Drawing Sheets

| Profile | Definition |
|---|---|
| VIEWER | Traditional user |
| RECORDER | System user recording on VHS device |
| INTERNET | User connecting to Internet |
| DATA_BRIDGE | System user routing information to PC |

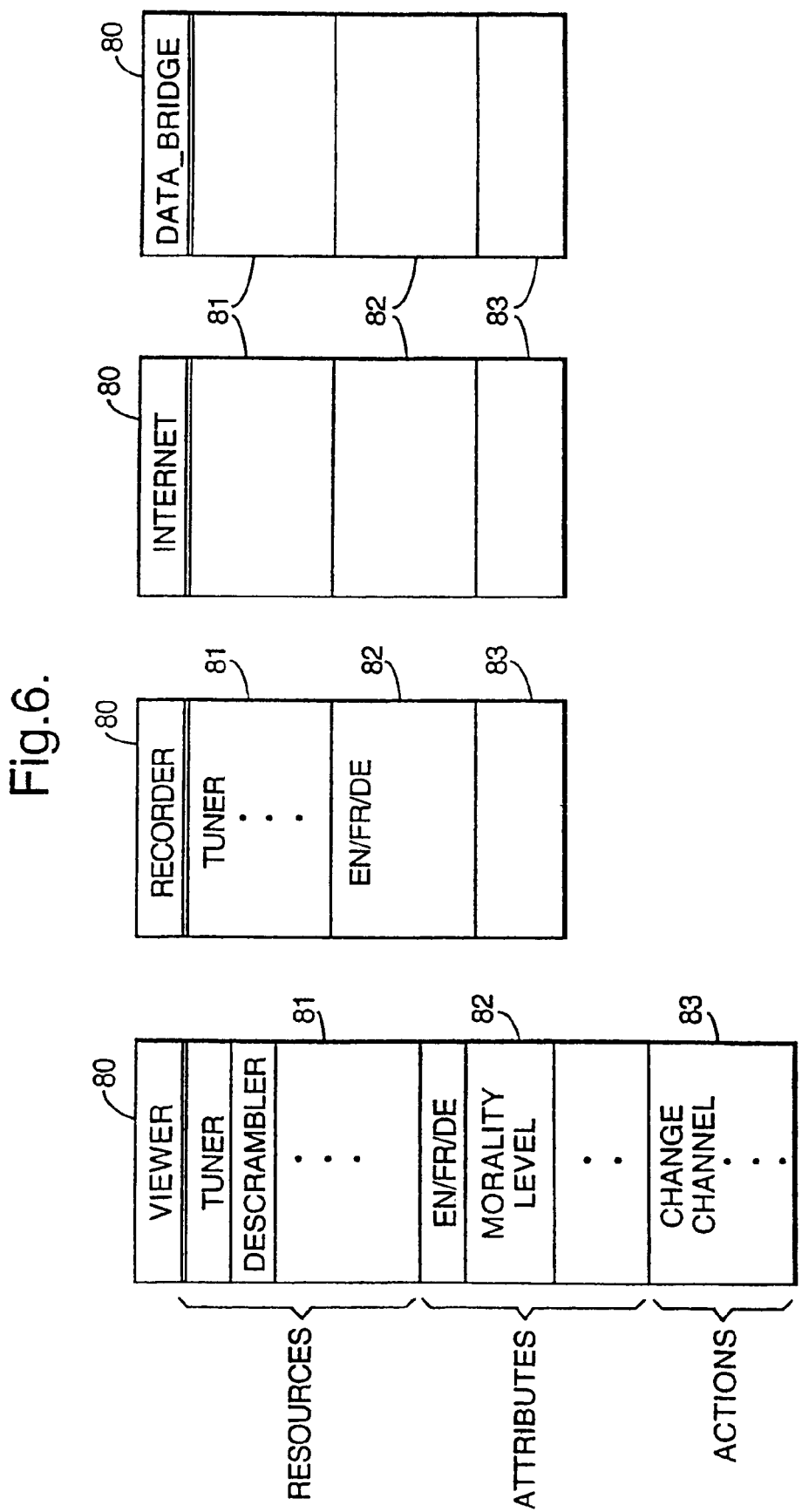

MULTIMEDIA TERMINAL ADAPTED FOR MULTIPLE USERS

The present invention relates to a terminal for processing digital audio-visual or multimedia data.

Terminals of this kind are well-known in the field of pay TV systems, where a decoder or set-top-box receives broadcast digital multimedia data, including audiovisual program information, as well as data for generating on-screen menus, data for implementing gaming or shopping applications etc. Depending on the system, the data may be broadcast in scrambled or clear form.

Prior to the introduction of digital technology, decoders were connected to a limited number of devices, usually only an associated television display or, at maximum, a television display and a VHS recorder. The advent of digital technology has led to an explosion in the number of devices that may be connected to the decoder as well as the functionalities of the decoder. For example, in addition to a Peritel analogue output to a TV and VHS device, the decoder may also include a connection via a digital bus, such as the IEEE 1394 bus, to other digital devices such as a DVD recorder, a PC etc.

As a complement to the increase in the number of external devices that may be connected to the decoder, there has been an increase in the number of modes of operation of a device. For example, in the standard set up of decoder and television, the decoder may be used either to simply supply television broadcast information, or to provide a connection to the internet.

In evolving away from the traditional analogue system, the architecture of presently known digital decoders has nevertheless tended to follow the preconceptions guiding their design. In particular, the architecture of standard decoders does not accurately reflect the role of a terminal in routing data between many external devices in parallel, the modes of operation of the decoder and the number of users of the system that may exist.

According to the present invention, there is provided a terminal for processing digital audio-visual or multimedia data including a data processing system and a memory, characterised in that the data processing system stores in the memory user profile data relating to the characteristics or preferences of a plurality of types of user of the terminal.

The definition of a user profile enables the processing system to flexibly treat and handle a number of users of the terminal. As will be appreciated, whilst a user profile may be associated with the connection of an external device or the personal identity of the operator accessing the terminal it is preferably associated with a mode of operation, for example, internet mode or television mode.

A user profile may also further be personalised for one or more operators. For example, after defining a user profile for the internet mode of operation of the terminal, it may be possible to define a first internet operator having certain rights and a second operator having other rights.

Advantageously, the user profile data includes resource data indicating the resources within the terminal accessible by each user. In the case of a decoder terminal, these resources may include rights of access to the demultiplexer to determine the data downloaded from the broadcast data stream etc.

Further advantageously, the user profile data includes priority data indicating the priority of each user in respect of access to one or more resources of the terminal. For example, for a decoder terminal, the user profile data may include a priority level indicating the priority of a particular user in accessing the demultiplexer. Conflicting channel demands between, for example, a TV device user and a recorder device user can thereafter be resolved by a management application based on this information.

In addition to resource data indicating the terminal resources available to a given device, the user profile data may further comprise data relating to the attributes of information to be supplied to each user. These attributes may include, for example, an indication of the language to be used in all graphical interface displays for that user.

In addition, the user profile data may further include data relating to the actions permitted by each user, such as whether a given user may change the demux channel etc. Although closely related to the resource data described above, this data may be used to define the parameters of the operations permitted by each device having access to a given resource.

Preferably, some or all of the characteristics or preferences of the user profile data may be modified during normal operation of the terminal by an operator. For example, the relative priority values of each user in accessing data may be modified by a viewer to give a VHS recorder output priority over a television output, or an internet connection priority over the television etc. In addition, or alternatively, some or all of the user profile data may be predetermined by the data processing system of the terminal.

The present invention is particularly adaptable to a terminal comprising a data processing system comprising, inter alia, a virtual machine and an object oriented application interface layer comprising a plurality of class libraries.

In particular, the application interface layer may comprise one or more class libraries defining the operation of the virtual machine with respect to user profile data. These classes may include, for example, a class library dedicated to management of user profile data in the memory cache of the terminal. Equally, the classes may include one or more user profile class libraries to define the characteristics of the data to be stored in the user profiles. For example, a method class may be used to define the attributes of the preferred language to be stored in the user profile.

The behaviour of classes within the application interface layer will depend on the language chosen. In the case of an application interface written in Java, for example, a single inheritance structure may apply between a class and its subclasses.

In one embodiment, the user profile classes may include a generic class library associated with the definition of generic characteristics of user profile data, and one or more sub-class libraries associated with the definitions of characteristics associated with a specific user profile.

The present invention is particularly applicable to a terminal in the form of a decoder adapted to receive data transmissions in a digital transmission system.

The present invention may equally extend to a method of operation of a terminal.

The term "decoder" may describe a receiver for receiving either encoded or non-encoded signals, for example, television and/or radio signals. Embodiments of such a decoder may include a decoder integral with the receiver for decoding the received signals, for example, in a "set-top box", such a decoder functioning in combination with a physically separate receiver, or a decoder integrated with additional elements, such as a web browser or a video recorder or a television.

As used herein, the term "digital transmission system" includes any transmission system for transmitting or broadcasting for example primarily audiovisual or multimedia digital data. Whilst the present invention is particularly applicable to a broadcast digital television system, the invention may also be applicable to a fixed telecommunications network for multimedia internet applications, to a closed circuit television, and so on.

There will now be described, by way of example only, a preferred embodiment of the invention in which:

FIG. 6 shows the elements of user profile data stored in the decoder memory for each of the user profiles of FIG. 5.

Figure 1:
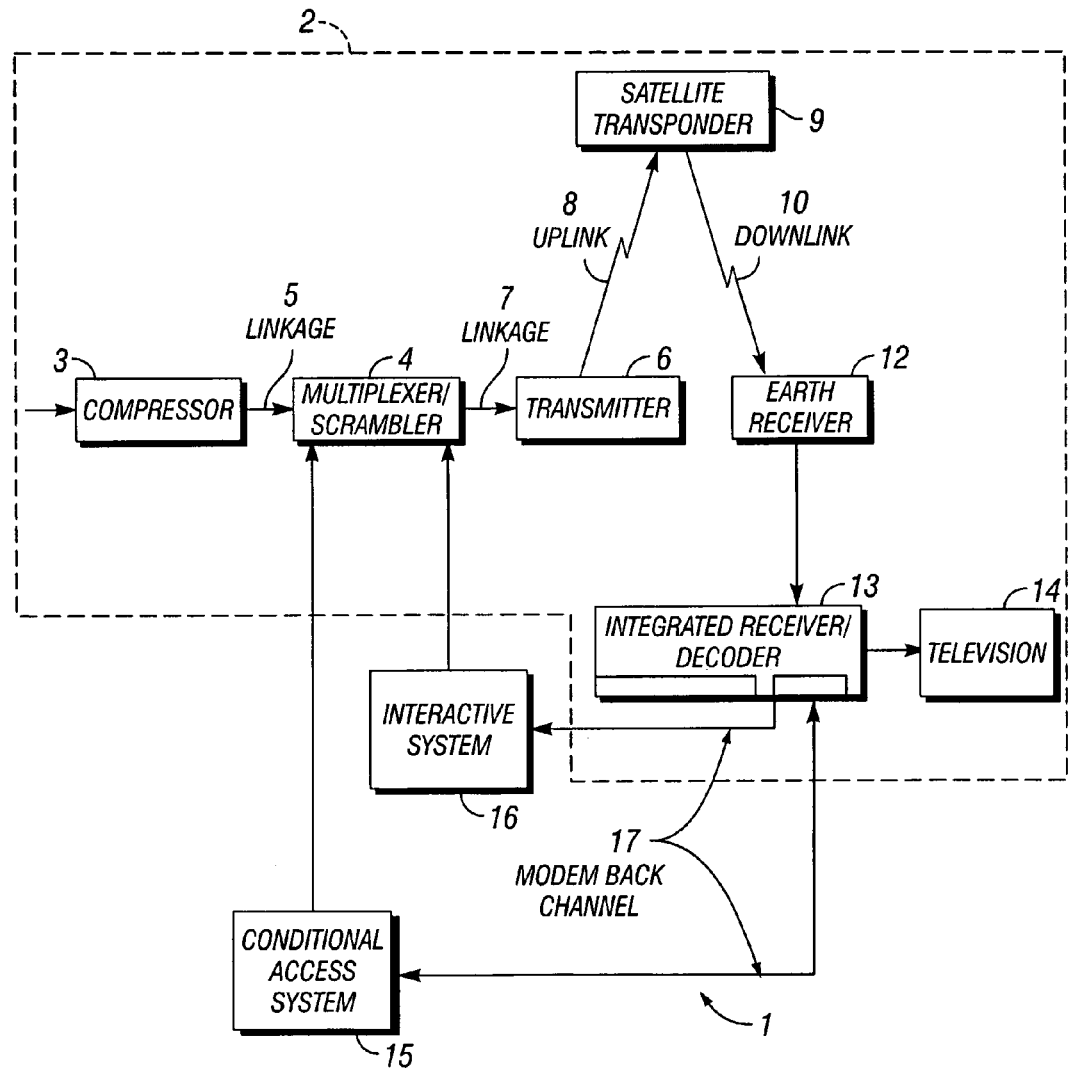
FIG. 1 shows a digital television system including a multimedia terminal in the form of a decoder.

An overview of a digital television system 1 according to the present invention is shown in FIG. 1. The invention includes a mostly conventional digital television system 2 that uses the known MPEG-2 compression system to transmit compressed digital signals. In more detail, MPEG-2 compressor 3 in a broadcast centre receives a digital signal stream (typically a stream of video signals). The compressor 3 is connected to a multiplexer and scrambler 4 by linkage 5.

The multiplexer 4 receives a plurality of further input signals, assembles the transport stream and transmits compressed digital signals to a transmitter 6 of the broadcast centre via linkage 7, which can of course take a wide variety of forms including telecommunications links. The transmitter 6 transmits electromagnetic signals via uplink 8 towards a satellite transponder 9, where they are electronically processed and broadcast via notional downlink 10 to earth receiver 12, conventionally in the form of a dish owned or rented by the end user. The signals received by receiver 12 are transmitted to an integrated receiver/decoder 13 owned or rented by the end user and connected to the end user's television set 14. The receiver/decoder 13 decodes the compressed MPEG-2 signal into a television signal for the television set 14.

Other transport channels for transmission of the data are of course possible, such as terrestrial broadcast, cable transmission, combined satellite/cable links, telephone networks etc.

In a multichannel system, the multiplexer 4 handles audio and video information received from a number of parallel sources and interacts with the transmitter 6 to broadcast the information along a corresponding number of channels. In addition to audiovisual information, messages or applications or any other sort of digital data may be introduced in some or all of these channels interlaced with the transmitted digital audio and video information.

A conditional access system 15 is connected to the multiplexer 4 and the receiver/decoder 13, and is located partly in the broadcast centre and partly in the decoder. It enables the end user to access digital television broadcasts from one or more broadcast suppliers. A smartcard, capable of deciphering messages relating to commercial offers (that is, one or several television programmes sold by the broadcast supplier), can be inserted into the receiver/decoder 13. Using the decoder 13 and smartcard, the end user may purchase commercial offers in either a subscription mode or a pay-per-view mode. In practice, the decoder may be configured to handle multiple access control systems, e.g. of the Simulcrypt or Multicrypt design.

As mentioned above, programmes transmitted by the system are scrambled at the multiplexer 4, the conditions and encryption keys applied to a given transmission being determined by the access control system 15. Transmission of scrambled data in this way is well known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 13 having access to an equivalent of the exploitation key stored on a smart card inserted in the decoder to decrypt the encrypted control word and thereafter descramble the transmitted data. A paid-up subscriber will receive, for example, in a broadcast monthly ECM (Entitlement Control Message) the exploitation key necessary to decrypt the encrypted control word so as to permit viewing of the transmission.

An interactive system 16, also connected to the multiplexer 4 and the receiver/decoder 13 and again located partly in the broadcast centre and partly in the decoder, enables the end user to interact with various applications via a modem back channel 17. The modem back channel may also be used for communications used in the conditional access system 15. An interactive system may be used, for example, to enable the viewer to communicate immediately with the transmission centre to demand authorisation to watch a particular event, download an application etc.

Figure 2:
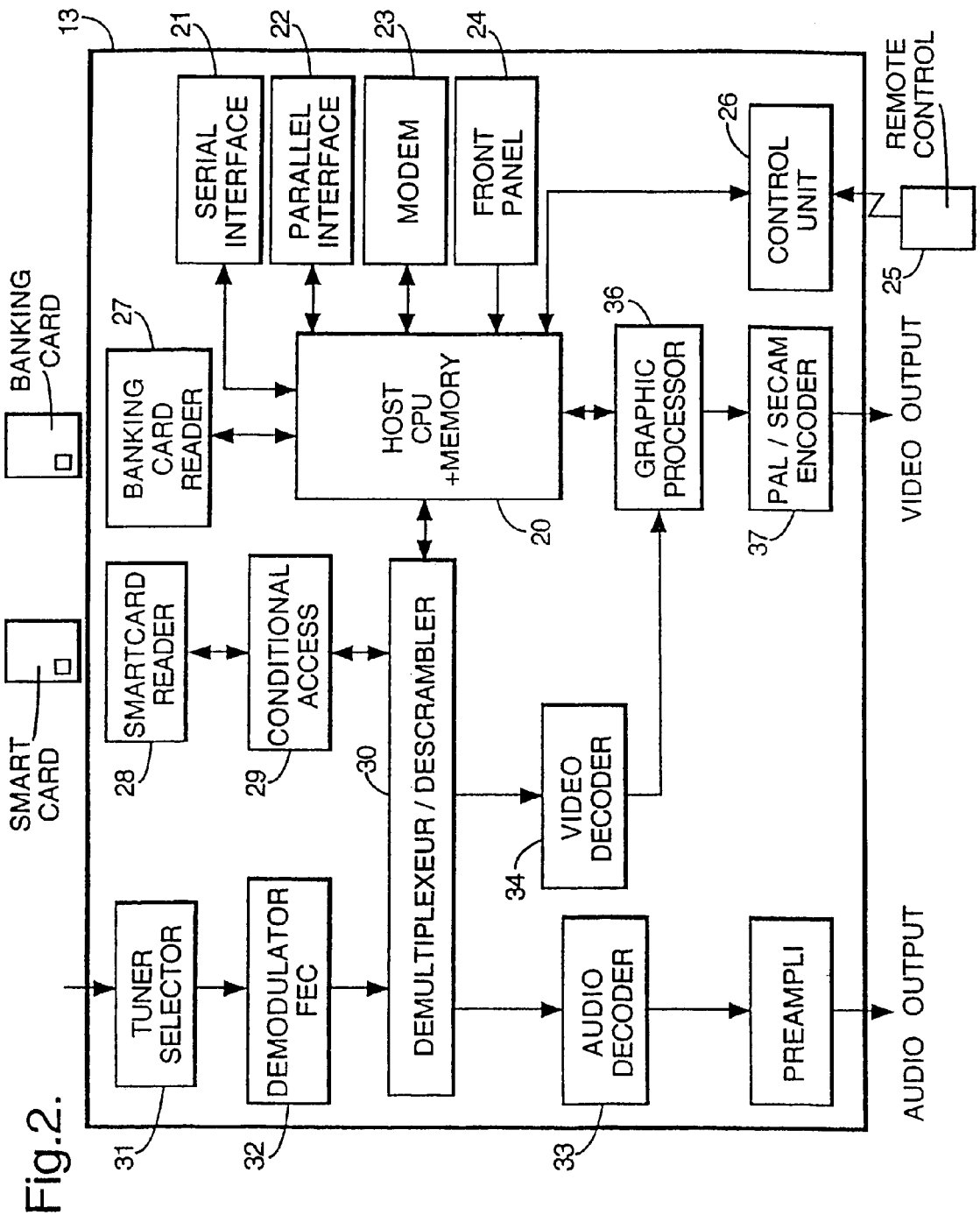
FIG. 2 shows the physical elements of the decoder of FIG. 1.

Referring to FIG. 2, the physical elements of the receiver/decoder 13 or set-top box adapted to be used in the present invention will now be described. The elements shown in this figure will be described in terms of functional blocks.

The decoder 13 comprises a central processor 20 including associated memory elements and adapted to receive input data from a serial interface 21, a parallel interface 22, and a modem 23 (connected to the modem back channel 17 of FIG. 1).

The decoder is additionally adapted to receive inputs from an infra-red remote control 25 via a control unit 26 and from switch contacts 24 on the front panel of the decoder. The decoder also possesses two smartcard readers 27, 28 adapted to read bank or subscription smartcards 29, 30 respectively. Input may also be received via an infra-red keyboard (not shown). The subscription smartcard reader 28 engages with an inserted subscription card 30 and with a conditional access unit 29 to supply the necessary control word to a demultiplexer/descrambler 30 to enable the encrypted broadcast signal to be descrambled. The decoder also includes a conventional tuner 31 and demodulator 32 to receive and demodulate the satellite transmission before being filtered and demultiplexed by the unit 30.

Processing of data within the decoder is generally handled by the central processor 20. The software architecture of the central processor corresponds to a virtual machine interacting with a lower level operating system implemented in the hardware components of the decoder.

Decoder System Architecture

Figure 3:
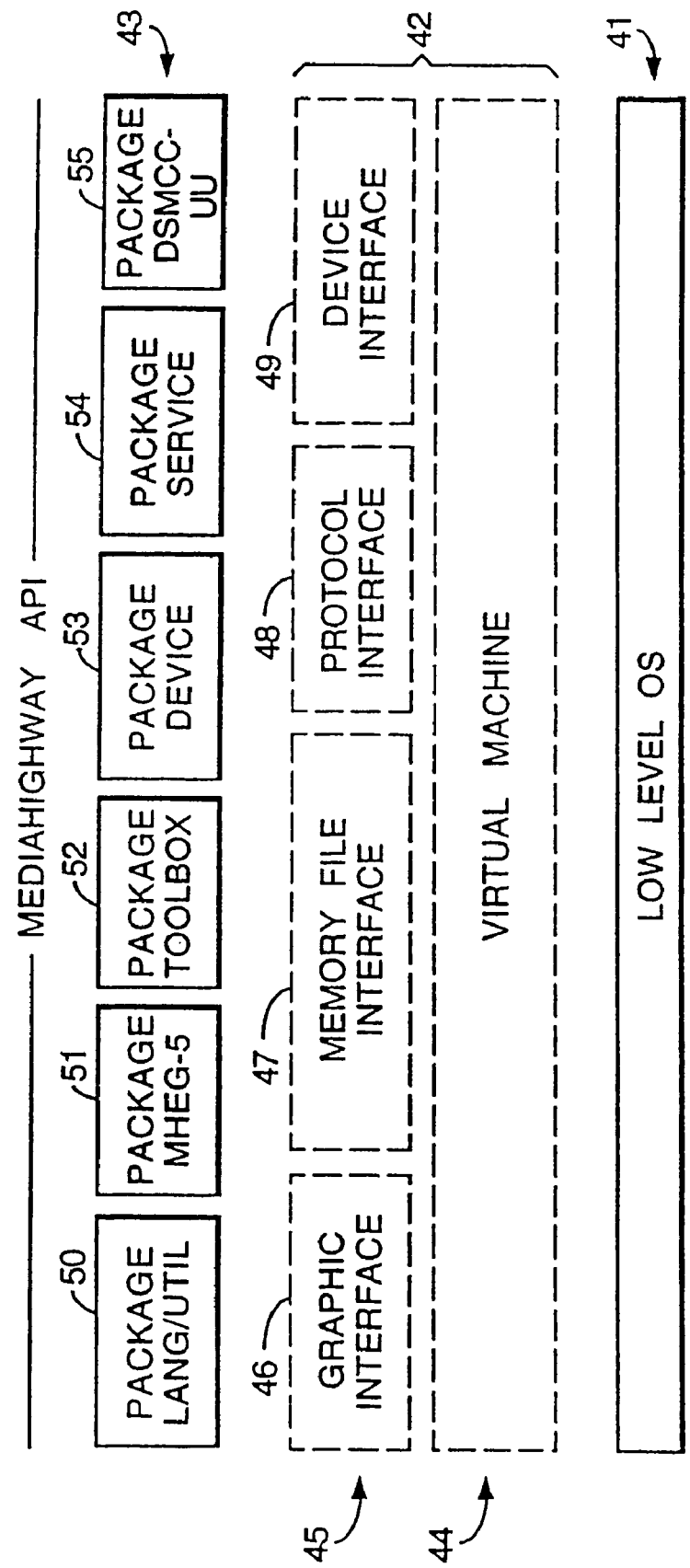
FIG. 3 shows the software architecture of the data processing system within the decoder.

Turning now to the architecture of the system within the receiver/decoder shown in FIG. 3, it will be seen that a layered architecture is used. The first layer 41 represents the operating system of the hardware of the receiver/decoder.

This is a real-time operating system chosen by the manufacturer to control the hardware elements of the receiver/decoder. The real-time operating system has a relatively fast response time in order to be able to correctly synchronise hardware operations. Event messages are passed between this layer and the middleware layer 42 immediately above.

The data processing system sits on top of the hardware operating system and comprises a middleware layer 42 and an application interface layer 43.

The middleware layer 42 is written in a language such as C ANSI and comprises the elements of a virtual machine 44 and a number of interfaces 45 including a graphical interface 46, a FLASH/PROM memory interface 47, a protocol interface 48 and a device interface 49.

The present invention uses a virtual machine in order to provide independence between upper level applications and the lower level operating system implemented by the set top box manufacturer. The interfaces 45 provide the link between operations of the virtual machine and the lower level operating system 41 and also include a number of intermediate level application modules more easily executed at this level.

The application interface (API) layer 43 comprises a number of high level packages 50–55, written in an object-oriented interpretative language, such as Java. These packages provide an interface between the applications created by the service provider (interactive program guide, teleshopping, internet browser etc) and the virtual machine of the system. Examples of such applications are given below.

The lower level OS is normally embedded in the hardware components of the decoder, although in some realisations, the lower level OS can be downloaded. The middleware and application interface layer packages can be downloaded into the RAM or FLASH memory of the decoder from a broadcast transmission. Alternatively, some or all of the middleware or application interface layer elements can be stored in the ROM or (if present) FLASH memory of the decoder. The decoder may even include a hard disc or DVD drive for memory storage purposes. As will be understood, the physical organisation of the memory elements of the decoder is distinct from the logical organisation of the memory.

Application Interface Layer

Referring to the application interface layer 43 shown in FIG. 3, and as described above, the packages in this layer are written with an object oriented language such as Java. Each package defines a set of class libraries called on during operation of the system. In the present system the following packages are installed.

Lang/util Package 50. This package defines the classes necessary for the manipulation of objects by the virtual machine. These class libraries normally form part of a standard library associated with the object oriented language chosen. MHEG-5 Package 51. This package defines the classes associated with the manipulation of graphical objects on the television display. Such objects are distinct from audio-visual data and can make up, for example, channel identifiers or text laid over displayed images. The definition of classes within this package should respect the MHEG-5 norms defined by the standards ETS 300777-3 and ISO/ISE 13522-5 (and the standard ISO/ISE 13522-6 in the case of a Java implemented system).

Toolbox Package 52. This package contains the classes used for downloading and decompression of information as well as the classes associated with the management of the file system and memory within the receiver/decoder and the classes associated with the connection to the internet etc.

Device Package 53. This package defines the classes necessary for management of peripherals attached to the receiver/decoder, as discussed above and including the modem, the smart card readers, the MPEG flow tuner etc.

Service Package 54. This package defines the classes necessary for the implementation of developing higher level interactive applications, such as management of credit card data etc.

DSMCC-UU Package 55. This package implements the protocols necessary for communication between a client and a server for data file search and reading. Implementation of this package should respect the norm ISO/IEC 13818-6 and directives defined in DAVIC part 9.

In normal operation, a further layer of interactive applications, written by the service provider and downloaded during broadcast as in conventional systems, will be laid over the interface packages defined above. These applications typically include a general application manager for managing the defined basic operations of the decoder, and one or more optional applications adding additional services. In particular, a user manager application may be used to manage user priority conflicts, as will be described below.

Depending on the applications to be introduced, some of the above packages may be omitted. For example, if the service provider does not intend to provide a common way for data reading, the DSMCC-UU package may be left out of the final system.

The packages 43 provide class libraries for an object-oriented programming environment. Their class behaviour will depend on the language chosen. In the case of a Java application, for example, a single inheritance class structure will be adhered to.

As will be understood, the grouping of a class or a set of classes in a package is a matter of formalism with respect to the functionality of a class. Certain classes related to management of peripheral devices may be, for example, classified either as belonging to the Device Package 53 or the Service Package 54.

Interface Layer

As shown, the interface layer is composed of four modules, a graphics module 46, a memory file management module 46, a protocol module 48 and a device manager 49. Whilst the modules at this level are described as interface modules their function is to provide a "glue" layer for the implementation of the application interface packages and for the operation of the virtual machine generally.

The graphics module 46, for example, provides the creation and management of graphical objects. It asks the low level OS to display basic graphic shapes such as single pixels, lines, rectangles etc. The implementation of this module depends on the graphics capability of the low level manufacturer's OS. In some ways complementary to the MHEG-5 package 51, these functions may be more efficiently executed at this code level than in the high level code chosen for the application layer above.

In a similar manner, the memory file management module 47 includes low level read/write file commands associated with the memory components of the system. Typically, the hardware operating system only includes commands necessary to read/write a sector or page within a memory component. As with the graphics module 46, this module enables a set of simpler lower level applications to be efficiently introduced in the system.

The protocol management module 48 defines a library of communication protocols that may be called upon in communications via, for example, the TCP/IP layer of the decoder. The device manager 49 is slightly different from the other modules in this layer in that it provides the link or interface between the hardware operating system and the layers above, including the other modules in the interface layer and the virtual machine. Commands or event messages that are received/sent to the hardware OS from the virtual machine, for example, are necessarily passed by the device manager for conversion according to the interface specifications between the two levels.

Virtual Machine Description

Figure 4:
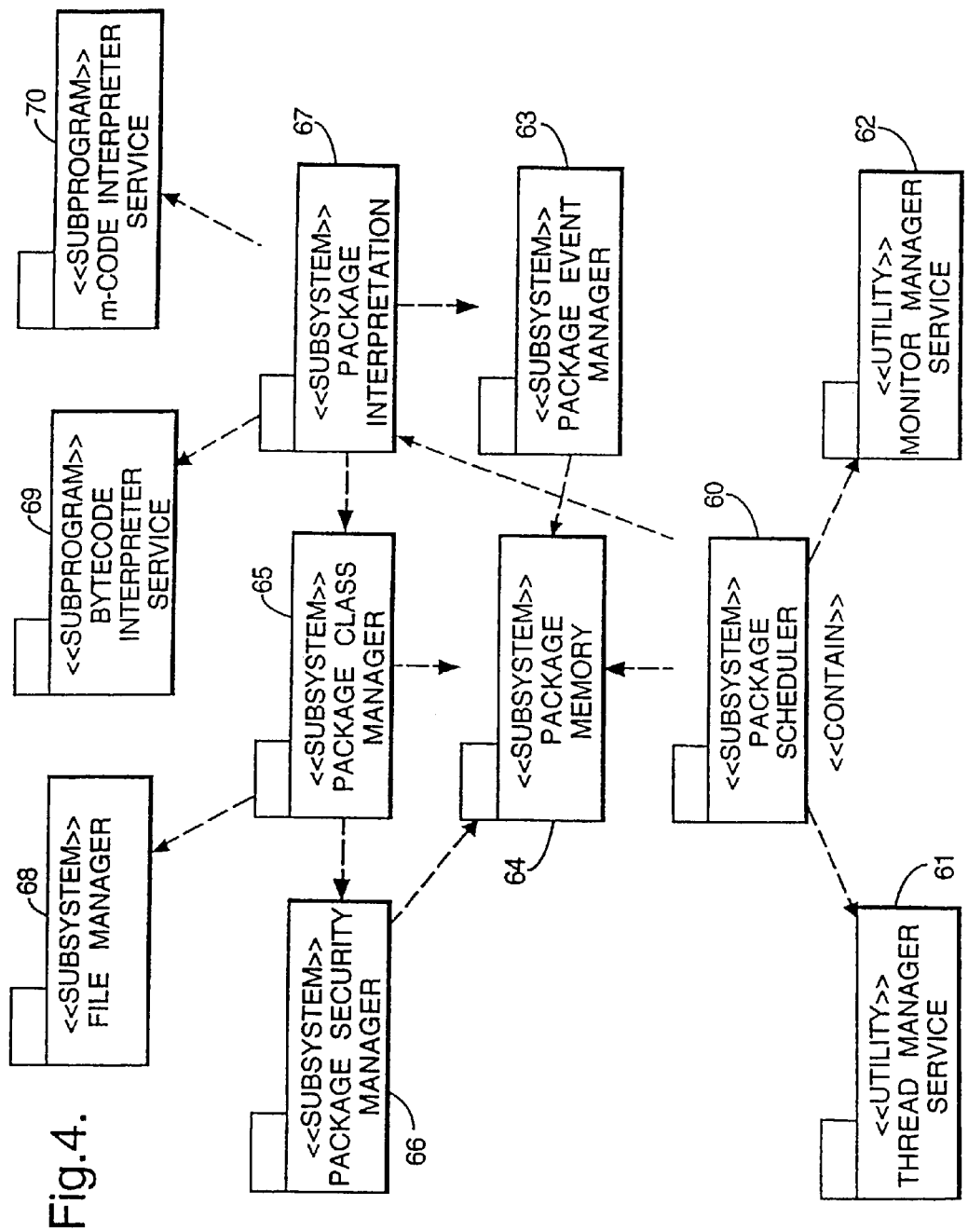
FIG. 4 shows the structure of the virtual machine used in the data processing system of FIG. 3.

Referring now to FIG. 4, the structure of the virtual machine 44 used in the system of the present invention will be described. The virtual machine used in the present invention is a pre-emptive multithread type machine. The general characteristics of such a machine are known in other contexts and the creation of code for implementation of such a machine will be within the scope of one skilled in the art. The virtual machine is composed of a number of elements, which interact broadly as shown in FIG. 4. The scheduler 60, composed of a thread manager service 61 and a monitor manager service 62, forms the heart of the multithread machine. The scheduler 60 orders the execution of threads created by applications externally of the virtual machine and those created by the virtual machine itself (e.g. a garbage collection thread as discussed below).

The event manager 63 handles an event routing table and the lists of events subscribed to by the threads and centralises the dispatch of event treatments.

The memory manager 64 handles the allocation and disallocation of the memory zones within the system memory and also handles the removal from the memory of non-referenced objects (garbage collection). The class manager 65 charges the classes of the application code downloaded in a broadcast signal, interacting with the security manager 66 to check the integrity of downloaded code and with the file manager 68, which implements the applications.

The file manager 68 carries out the implementation of the system files and the handles the mechanism of downloading of interactive applications and data.

The security manager 66 handles the level of access permitted to downloaded applications, some applications having the ability to carry out more operations than others in relation to the file system.

The interpreter 67 comprising a bytecode interpretation service 69 and a "m-code" interpretation service 70 handles the interpretation of applications written in these two codes, bytecode being associated with Java applications and m-code being the name given to a proprietary code developed by the applicants.

User Profiles

The increasing hardware processing power available in decoders has led to the increasing use of decoders in the routing of information between a number of potential users of the system. For example, a single IRD can serve as the input point for a broadcast MPEG stream, this stream being processed and diverted to one or more connected television displays, an analogue VHS recorder connected via a Peritel link, a PC or DVD device connected via an IEEE 1394 bus etc.

Figures 5, 7:
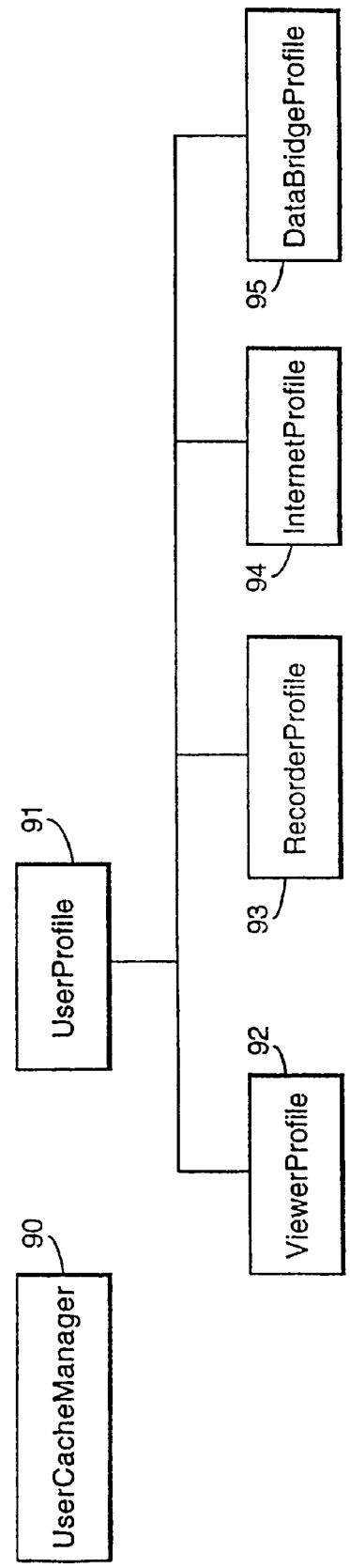
FIG. 5 shows a set of predetermined user profiles to be defined in this embodiment of the invention.
FIG. 7 shows the structure of class libraries within the application interface layer of the software architecture to be used in the definition of the user profiles.

An idea central to the present embodiment is the definition of a number of "users" of the decoder, each user having a certain characteristic profile. For example, a high level application may define a number of user profiles for a television viewer, a VHS recorder, a person directly using the decoder to access to the internet, a person using the decoder to route information to a PC etc. FIG. 5 shows an example of a set of typical user profiles. This list may be expanded to include, for example, a DVD device connected to the decoder etc.

A user profile may be defined in relation to an external device connected to terminal, for example the connection television, where the terminal simply supplies audiovisual data to the television display. The user profile may also be defined in relation to the actual identity of one or more physical persons or "operators" accessing the terminal.

In the present case, however, a user profile is defined in relation to a mode of operation of the device, such as its operation in an internet mode. Each user profile defined for one set up or mode of operation may be personalised for the different persons using the decoder terminal. For example, one person may have different viewing preferences from another, or may be prohibited from watching certain channels. The information regarding the preferences of each person is stored within the user profile for that mode of operation.

Each user profile will have a unique and characteristic user ID and one or more priority values determining the priority of this user in obtaining one or more decoder resources. In this case, the term "resources" refers to a functionality of the decoder such as access to the demultiplexer to download selected data. The high level application manager defines and stores the characteristics of these profiles and handles the sharing of resources and user conflicts with reference to the user priority.

For example, a user manager may give priority to a user "RECORDER" for example, such that a demand by this user to use a given resource will take priority over a demand by the user "VIEWER" to use that resource. In particular, the user "RECORDER" may have preference over the user "VIEWER" as far as choice of demux channel is concerned. In this way, the application prevents a change channel signal received from a viewer from taking priority over the channel chosen by someone wishing to record a program being transmitted at the same time.

In this example, where a single priority value is assigned to each user, the user "RECORDER" will always take priority over "VIEWER" for access to any resource. Alternatively, multiple priority values may be assigned, such that "VIEWER" has priority for certain resources, "RECORDER" priority for others etc.

The priority evaluation is handled by the user manager and may be interactive, i.e. an operator may determine by programming the decoder with the handset whether to give priority to an internet connection over television viewing etc.

Each user profile includes, in addition to the user ID value, a set of preferences stored in a cache memory in the decoder, for example, in the FLASH memory of the decoder. These preferences will be called up by the application upon at each booting up of the decoder. As shown in FIG. 6, user profile data 80 includes resource data 81, attribute data 82, and action data 83.

The resource data 81 includes a list of internal decoder resources that may be accessed by the user, for example, access to the MPEG tuner and descrambler. As will be understood, a resource in this context refers to a logical resource relating to a combination of physical elements associated with a demux process, a conditional access system etc.

Attribute data 82 includes preferred attributes specific to that user, for example, the language (English, French, German etc.) that will be preferentially used in written displays on the screen, the morality level of programmes that can be viewed by the user etc. The action data 83 includes a list of permitted actions that may be carried out by that user, including change channel etc.

The user profile data can include fixed values predetermined by the user manager (for example, all users are capable of accessing the resources of the tuner, the demultiplexer etc.) as well as values modifiable by and personalised to each operator capable of using the terminal in each operating mode (morality level of programmes that may be watched etc.).

Values modifiable by an operator can include values for each user profile set by an operator at the moment of start-up of the decoder as well values set by an operator each time a session is started with a particular user profile.

The definition of multiple user profiles corresponding to modes of operation and including data regarding priority to terminal resources for each profile paves the way for parallel processing of such modes by the terminal so as to permit, for example, a single terminal to handle and process data for viewing via a television at the same time as forwarding different data to be recorded by an associated recording device, treated by a PC etc. In such systems the terminal becomes effectively a data hub for a number of associated peripheral devices operating in parallel. This sort of operation is particularly well managed by a multithread system of the kind shown in relation to FIGS. 3 and 4, and as will now be described.

In order to permit the creation of a series of user profiles, it is desirable to include within the API layer object classes adapted to engage with the virtual machine to achieve this. Referring back to FIG. 3, and as discussed above, the class libraries defined in the API layer 43 supply the parameters of operation within which the higher level applications may operate. In particular, in carrying out certain actions, a high level application will include instructions referring to classes of objects defined in this layer.

Each class will respect the rules of the object oriented programming language chosen for this layer. Typical object classes include classes relating to the management of the ports of the decoder, such as the credit card interface, as well as other operations such as management of the access control system. A number of standard classes in the API layer have been defined by the DAVIC group in relation to, for example, access to sections and tables in a downloaded MPEG stream.

There will now be described, with reference to FIG. 7, a structure of classes adapted to provide the possibility of defining user preferences for each such user and to facilitate the handling of multiple users by a high level application. The classes that will be described may be included, for example, in the Service Package 54 installed in the API layer 43.

Referring to FIG. 7, a class UserCacheManager shown at 90 is used to permit applications to access and manage user profile data stored in the memory cache of the system. This class is a static class. As with standard object oriented program architectures, the class library includes a list of methods or commands such as a method initialise( ) to initialise the memory cache, a method getMaxUserProfiles( ) to know the maximum number of users to be supported by the system, a method getActiveUserID( ) to know the number of users currently active etc. The class may also be associated with a list of events, signalling to the application the occurrence of an event, such as the creation or deletion of a user profile.

The classes additionally include a class UserProfile shown at 91. This class is a generic class, adapted to permit the creation of a number of user profiles. The class includes a list of methods such as getUserID( ) to recover the identity of a user, getPriorityLevel( ) to recover the priority of access to resources, setGeneralAttribute( ) to set the value of a general attribute etc. The class is also associated with a list of events indicating, for example, a change of channel demanded by a user etc.

These methods are methods which permit an indirect access to methods, thereby avoiding the necessity of having a method for each attribute. The number of attributes managed by these methods will depend on the choice of the system architect and may evolve with time.

In practice, the choice and functionality of the number of methods in this and the other classes may also be determined at the discretion of the system architect and in dependence on the processing power of the hardware, the characteristics of the virtual machine, the number of functionalities the system architect wishes to introduce etc.

As will be described, some of the methods may be inherited by other classes in accordance with the principles of the object oriented language chosen for the application interface layer.

In particular, the classes ViewerProfile 92, RecorderProfile 93, InternetProfile 94, DataBridgeProfile 95, define methods specific to the definition of the user profile VIEWER, RECORDER, INTERNET, DATA_BRIDGE etc. The classes 92 to 95 may include methods inherited from the generic UserProfile class 91. For example, using the command setGeneralAttribute (Attribute, Value of Attribute), the preferred value of an attribute associated with the user profile in question may be determined.

Taking the case of a viewer profile in which the morality level of a viewer is to be defined, the instruction setGeneralAttribute (Morality-Level, 18)

in the context of programming the profiles for the user VIEWER will set an authorised age limit for this user. This value will be defined and called up by a higher level application and can be used to prevent access by the user VIEWER to certain demux channels, unless the operator declares his age. For each person having access to the decoder in the mode VIEWER, a set of preferences may thus be defined by instances within the class VIEWER.

As will be understood, the definition in the API of a number of classes specific to the creation of an identified "user" enables the system to easily define a plurality of user profiles for each of these users. The provision of a class UserCacheManager permits the handling of cached profile data relating to a user, whilst the generic classes UserProfile and the sub-classes ViewerProfile, RecorderProfile etc. provide the tools necessary for the definition of each user profile.

The exact composition and definition of the methods and events within these classes is however discretionary and it will be within the competence of one skilled in the art to determine the best definition of such objects in dependence on the characteristics of the chosen virtual machine etc.

I claim:

1. A terminal for processing digital audio-visual or multimedia data comprising:
   a data processing system; and
   a memory,
   wherein the data processing system stores in the memory a plurality of user profiles,
   wherein each user profile is defined in relation to a connection to an external device and comprises user profile data, wherein the user profile data includes resource data indicating resources within the terminal accessible by the users and priority data indicating a priority of the user with respect to other users that access the resources of the terminal and the external device, wherein the user profile data further relates to characteristics of a user of the terminal, wherein the data processing system includes a virtual machine and an object oriented application interface layer, wherein the application interface layer includes a plurality of class libraries having a user profile class library adapted to define the characteristics of the user profile data, and wherein the user profile class library includes a generic class library associated with a definition of generic characteristics of the user profile data and a sub-class library associated with definitions of characteristics associated with a specific user profile.

2. The terminal as claimed in claim 1, where each user profile is defined in relation to a mode of operation of the terminal.

3. The terminal as claimed in claim 1, where each user profile is defined in relation to an identity of an operator.

4. The terminal as claimed in claim 1, where the user profile data comprises data relating to attributes of information to be supplied to the user.

5. The terminal as claimed in claim 1, where the user profile data comprises data relating to actions permitted by the user.

6. The terminal as claimed in claim 1, where at least one of the characteristics of the user profile data are modifiable during normal operation of the terminal by an operator.

7. The terminal as claimed in claim 1, where at least a portion of the user profile data is predetermined by the data processing system of the terminal.

8. The terminal as claimed in claim 1, in which the application interface layer comprises at least one class library of the plurality of class libraries defining the operation of the virtual machine with respect to the user profile data.

9. The terminal as claimed in claim 1, in which the application interface layer comprises a class library dedicated to memory management of the user profile data in the memory.

10. The terminal as claimed in claim 1, comprising a decoder adapted to receive data transmissions in a digital transmission system.

11. A method of operation of a terminal for processing digital audio-visual or multimedia data including a data processing system and a memory comprising:

storing and accessing in the memory a plurality of user profiles, wherein each user profile is defined in relation to a connection to an external device and comprises user profile data, wherein the user profile data includes resource data indicating resources within the terminal accessible by the user and priority data indicating a priority of the user with respect to other users that access the resources of the terminal and the external device, and wherein the user profile data further relates to the characteristics of a user of the terminal, wherein the data processing system includes a virtual machine and an object oriented application interface layer, wherein the application interface layer includes a plurality of class libraries having a user profile class library adapted to define the characteristics of the user profile data, and wherein the user profile class library includes a generic class library associated with a definition of generic characteristics of the user profile data and a sub-class library associated with definitions of characteristics associated with a specific user profile.

12. A terminal for processing digital audio-visual or multimedia data comprising:

a data processing system; and a memory, wherein the data processing system stores in the memory a plurality of user profiles, wherein each user profile comprises user profile data relating to characteristics of a user of the terminal, wherein the data processing system includes a virtual machine and an object oriented application interface layer, wherein the application interface layer includes a plurality of class libraries having a user profile class library adapted to define the characteristics of the user profile data, and wherein the user profile class library includes a generic class library associated with a definition of generic characteristics of the user profile data and a sub-class library associated with definitions of characteristics associated with a specific user profile.

* * * * *

UNITED STATES PATENT AND TRADEMARK OFFICE
CERTIFICATE OF CORRECTION

PATENT NO. : 6,981,042 B1  Page 1 of 1
DATED : December 27, 2005
INVENTOR(S) : Francois Rey It is certified that error appears in the above-identified patent and that said Letters Patent is hereby corrected as shown below:

Column 11,
Line 3, replace "users" with -- user, --.

Signed and Sealed this

Thirteenth Day of June, 2006

JON W. DUDAS
*Director of the United States Patent and Trademark Office*